(12) United States Patent
Ding

(10) Patent No.: US 8,830,517 B2
(45) Date of Patent: Sep. 9, 2014

(54) IMAGING CARTRIDGE CHIP WITH SELF-ADAPTIVE CONTACTS, IMAGING CARTRIDGE AND SELF-ADAPTIVE METHOD

(71) Applicant: Apex Microelectronics Company Limited, Zhuhai (CN)

(72) Inventor: Li Ding, Zhuhai (CN)

(73) Assignee: Apex Microelectronics Company Limited, Zhuhai (CN)

( * ) Notice: Subject to any disclaimer, the term of this patent is extended or adjusted under 35 U.S.C. 154(b) by 0 days.

(21) Appl. No.: 14/162,071

(22) Filed: Jan. 23, 2014

(65) Prior Publication Data
US 2014/0132990 A1    May 15, 2014

Related U.S. Application Data

(63) Continuation of application No. PCT/CN2012/081325, filed on Sep. 13, 2012.

(30) Foreign Application Priority Data

Nov. 4, 2011    (CN) .......................... 2011 1 0344995

(51) Int. Cl.
| | | |
|---|---|---|
| G06F 3/12 | (2006.01) | |
| H04N 1/32 | (2006.01) | |
| G03G 21/18 | (2006.01) | |
| B41J 2/175 | (2006.01) | |

(52) U.S. Cl.
CPC ........... *H04N 1/32598* (2013.01); *B41J 2/1753* (2013.01); *G03G 21/1882* (2013.01)

USPC .......... 358/1.15; 358/1.16; 358/1.1; 358/474; 341/40; 341/50

(58) Field of Classification Search
CPC .......................... B41J 2/17566; B41J 2/17546
USPC ................................. 358/474, 1.1, 1.15, 1.16
See application file for complete search history.

(56) References Cited

U.S. PATENT DOCUMENTS

| | | | |
|---|---|---|---|
| 4,492,968 A * | 1/1985 | Lee et al. ......................... | 347/10 |
| 5,398,261 A * | 3/1995 | Marbot ......................... | 375/257 |
| 5,815,179 A * | 9/1998 | Silverbrook ..................... | 347/59 |

(Continued)

FOREIGN PATENT DOCUMENTS

| | | |
|---|---|---|
| CN | 201289641 Y | 8/2009 |
| CN | 101782739 A | 7/2010 |
| CN | 102164070 A | 8/2011 |
| WO | WO2011/113328 A1 | 9/2011 |

OTHER PUBLICATIONS

International Search Report of International Application No. PCT/CN2012/081325, dated Dec. 20, 2012.

(Continued)

*Primary Examiner* — Dennis Dicker
(74) *Attorney, Agent, or Firm* — J.C. Patents

(57) ABSTRACT

An imaging cartridge chip with self-adaptive contacts includes a set of contacts. Each contact of the set of contacts has the function of a full series of contacts. The specific function of each contact in the set of contacts is determined by identifying a signal received by the contact from an external contact.

19 Claims, 4 Drawing Sheets

(56) References Cited

U.S. PATENT DOCUMENTS

| | | | |
|---|---|---|---|
| 6,231,173 B1* | 5/2001 | Pawlowski et al. | 347/86 |
| 6,779,875 B2* | 8/2004 | Pawlowski et al. | 347/50 |
| 7,425,055 B2* | 9/2008 | Chen | 347/50 |
| 7,483,159 B2* | 1/2009 | Tokutomo et al. | 358/1.15 |
| 2005/0151764 A1* | 7/2005 | Grady et al. | 347/7 |
| 2008/0159440 A1 | 7/2008 | Jaffer et al. | 375/317 |

OTHER PUBLICATIONS

Extended European Search Report of corresponding European application No. 12 84 4907.1, dated May 14, 2014.

* cited by examiner

Storing corresponding relationship data structures, illustrating different static contact distribution cases and corresponding to different storage units, on the current mainstream imaging device bodies, into the memory of the imaging cartridge chip in advance

↓

Acquiring the type of the imaging cartridge chip

↓

Calling the corresponding relationship data structures from the memory to finish contact determination

FIG. 6

IMAGING CARTRIDGE CHIP WITH SELF-ADAPTIVE CONTACTS, IMAGING CARTRIDGE AND SELF-ADAPTIVE METHOD

CROSS-REFERENCE TO RELATED APPLICATIONS

This application is a continuation of International Application No. PCT/CN2012/081325, filed on Sep. 13, 2012, which claims priority to Chinese Patent Application No. 201110344995.X, filed on Nov. 4, 2011, both of which are hereby incorporated by reference in their entireties.

FIELD OF THE INVENTION

The present invention relates to an imaging cartridge chip with self-adaptive contacts, an imaging cartridge, and a self-adaptive method.

BACKGROUND OF THE INVENTION

There are various types of imaging devices, for instance, printers, copiers, scanners, and so on. The imaging device generally comprises an imaging body and imaging cartridges, wherein currently, all the imaging cartridges are detachably mounted on the imaging device; the imaging cartridges such as ink cartridges and toner cartridges are filled with recording materials for imaging; the imaging body adopts the imaging cartridges to form images on medium materials such as paper; chips are usually fixed on the imaging cartridges and referred to as imaging cartridge chips or ink cartridge chips; the ink cartridge chip is usually mounted on the imaging cartridge, or a circuit board of the imaging cartridge; and the circuit board mainly comprises the chip and peripheral circuits thereof. The chip generally includes a storage unit and a communication interface unit, wherein the storage unit is configured to store information such as the variety of ink, the data about the manufacturing date of the ink cartridge, the number of print pages, the serial number of the ink cartridge and the remaining ink amount. In addition, the imaging body reads and writes the storage unit through the communication interface unit. Currently, the read-write operation of the imaging body on the storage unit of the imaging cartridge chip adopts the following two modes:

1. asynchronous communication mode: a physical interface of the communication mode includes the following signal lines: a power supply terminal VCC connected with a voltage source signal line, a clock terminal CLK connected with a clock signal line for providing synchronous clock, a reset terminal RST connected with a reset signal line for providing a reset signal, a data terminal I/O connected with a data line for achieving the information interaction between the chip and the imaging device, and a ground terminal GND, 5 signal lines in total.

2. IIC bus, also known as I2C bus, being a multi-directional control bus: a physical interface of the IIC bus is also provided with four signal lines: a power supply terminal VCC, a clock signal terminal SCL, a data terminal SDA and a ground terminal GND.

The imaging body adopts the above two communication protocols to read and write the ink cartridge chip. The main physical connection is electrical contact portions, i.e. oft-stated contacts, disposed on the chip. Side terminals of the imaging device body corresponding to the contacts are respectively disposed on the imaging body. When the ink cartridge is mounted on the imaging device body, the side terminals of the imaging device body make electrical contact with the contacts on the ink cartridge chip, so that the data transmission between the ink cartridge chip and the imaging device can be achieved.

The contacts on the imaging cartridge chips with the terminals on the current market are all contacts with fixed functions such as power supply, clock, reset line, ground line and data, namely the contacts have specific functions and cannot be changed again in the design, processing, use and other links of the chip.

The fixed contact design has low cost; the contact distribution of the chips corresponds to the contact distribution of corresponding devices one by one, which is intuitive; and the functional needs of the ink cartridge chip can be satisfied. However, as the contact functions of the ink cartridge chip are locked and the contacts are fixed, the layout flexibility of a circuit board can be reduced in the use of the chip. In particular, when one chip is required to correspond to devices with different contact distribution modes, circuit boards with various kinds of contact distribution modes corresponding to the devices with different contact distribution modes must be designed at this point. One chip is required to be produced originally, but various different chip products are extended due to different contact distribution modes of different devices. Therefore, a plurality of problems can be brought to the production and processing, the production management and the product inventory, and the use convenience of the chips corresponding to various contact distribution modes can be limited.

For example, as for ink cartridge or toner cartridge chips used on printer consumables, all the printers produced by printer manufacturers in a very long period correspond to the same consumable chip. But along with the continuous production of new models of printers by the printer manufacturers, the update of the ink cartridge chips corresponding to the printers tend to lag behind, and hence the phenomenon that the chip is not changed but the contact distribution of the chip is constantly changed along with the change of side terminals of printer devices may occur. As the contacts of the previous chips have fixed functions, if the functions of the side terminals of the printer devices are changed, even if new data are written into the previous chips, the chips cannot be used again due to the limitation of the contact functions. Therefore, when old models of chips are used, the contact positions are changed by the re-design of circuit boards so as to be adaptive to new models of printers, which result in a large number of different contact chip inventories and corresponding problems in the aspect of management and cost.

SUMMARY OF THE INVENTION

The present invention provides an imaging cartridge chip with self-adaptive contacts and a contact identification method so that the imaging cartridge chip can achieve the self-adaptive function, aiming at the problems in management and cost during the production of the imaging cartridge chip in a current imaging device such as a printer.

The technical proposal adopted by the present invention to achieve the objective of the present invention is that: the present invention provides an imaging cartridge chip with self-adaptive contacts, which comprises a group of dynamic contacts, wherein the dynamic contacts make contact with static contacts disposed on an imaging body; the imaging cartridge chip is communicated with the imaging body via the contact of the dynamic contacts and the static contacts; each contact in the dynamic contacts has a full range of contact functions; and the imaging cartridge chip further comprises a contact identification module configured to determine the specific function of each contact in a group of the dynamic contacts according to a signal acquired from the dynamic contact.

Moreover, in the imaging cartridge chip with the self-adaptive contacts, the module of automatic contact-identifying includes a signal acquisition unit, an module of automatic contact-identifying and a contact distribution locking module, in which the signal acquisition unit is connected with the dynamic contacts and configured to acquire the electric signal characteristic of each static contact when the dynamic contacts make contact with the static contacts;

the module of automatic contact-identifying is connected with the signal acquisition unit and configured to receive the electric signal characteristic of each contact acquired by the signal acquisition unit and obtain corresponding function of each static contact on the imaging body; and the contact distribution locking module is connected with the module of automatic contact-identifying and configured to select the corresponding function of the static contact from a full range of the contact functions contained in each contact, and lock the corresponding function of the static contact.

Furthermore, in the imaging cartridge chip with the self-adaptive contacts, the contact distribution locking module includes a locking electronically erasable programmable read-only memory (EEPROM) and a contact distribution executing unit, in which the locking EEPROM is read and written by the module of automatic contact-identifying which locks corresponding static contact functions on corresponding static contacts by writing automatically identified contact functions into the EEPROM; and the contact distribution executing unit is configured to read the locking EEPROM and execute specific functions in the locking EEPROM, selected from a full range of the contact functions.

Furthermore, in the imaging cartridge chip with the self-adaptive contacts, a full range of the contact functions include corresponding functions on each dynamic contact.

Furthermore, in the imaging cartridge chip with the self-adaptive contacts, the contact identification module includes a storage unit, a signal acquisition unit, a module of automatic contact-identifying, a locking EEPROM and a contact distribution executing unit, in which the storage unit is configured to store data corresponding to the distribution of contact functions on various types of imaging body;

the signal acquisition unit is connected with the dynamic contacts and configured to acquire the electric signal characteristic of each static contact;

the module of automatic contact-identifying is connected with the signal acquisition unit and configured to receive the electric signal characteristic of each contact acquired by the signal acquisition unit and obtain corresponding function of each static contact on the imaging body, call the data, corresponding to the corresponding distribution of contact functions, in the storage unit according to the positions of differently defined contacts, and write the data into the locking EEPROM; and the contact distribution executing unit is configured to read the locking EEPROM and select specific functions in the locking EEPROM from a full range of the contact functions.

Still furthermore, in the imaging cartridge chip with the self-adaptive contacts, the imaging cartridge chip further comprises an internal power supply acquisition circuit which is respectively connected with an internal power supply terminal and an internal power supply ground terminal of the imaging cartridge chip; the internal power supply acquisition circuit includes a first lead group configured to connect each contact to the internal power supply terminal of the imaging cartridge chip, a second lead group configured to connect each contact to the internal power supply ground terminal of the imaging cartridge chip, and unilateral conductive devices respectively arranged on each lead in the first lead group and the second lead group; the unilateral conductive devices on the first lead group are configured to achieve the conduction from the contacts to the internal power supply terminal of the imaging cartridge chip; and the unilateral conductive devices on the second lead group are configured to achieve the conduction from the internal power supply ground terminal to the contacts.

Still furthermore, in the imaging cartridge chip with the self-adaptive contacts, the unilateral conductive devices are diodes; on the first lead group, P poles of the diodes are connected with the contacts and N poles are connected with the internal power supply terminal of the imaging cartridge chip; and on the second lead group, N poles of the diodes are connected with the contacts and P poles are connected with the internal power supply ground terminal of the imaging cartridge chip.

The present invention further provides an imaging cartridge, which comprises the foregoing imaging cartridge chip.

The present invention further provides a self-adaptive method of the imaging cartridge chip with the self-adaptive contacts, which comprises the following steps of:

step A: contacting the dynamic contacts with the static contacts and causing the module of automatic contact-identifying to acquire the electric signal characteristic of each contact;

step B: causing the module of automatic contact-identifying to automatically identify contacts according to the electric signal characteristic of each contact; and step C: selecting a function automatically identified in the step B from a full range of functions of each contact, and locking the function on the contact.

Wherein, in the step B:

the contact electrified at first is a contact of a power line; the contact of which the normal level is high secondly is a contact of a reset signal line; the contact with the highest signal frequency is a contact of a clock line; the contact of which the signal frequency is higher than that of the power contact and the reset contact but lower than that of the clock contact is a contact of a data line; and the contact which is always in the low level is a contact of a ground line.

Or alternatively, the contact which has stable high level at first is a contact of a power line; the contact which is stably electrified secondly is a contact of a reset signal line; the contact which is converted to be in high level next is a contact of a clock line; the signal which is converted to be in high level after a signal of the clock line contact is converted to be in high level is a signal of a data line; and the contact which is always in the low level is a contact of a ground line.

Or alternatively, the contact which has stable high level at first is a contact of a power line; the contact which is stably electrified secondly is a contact of a reset signal line; the contact which is converted to be in high level next is a contact of a data line; the signal which is converted to be in high level after a signal of the data line contact is converted to be in high level is a signal of a clock line; and the contact which is always in the low level is a contact of a ground line.

Or alternatively, the contact which has stable high level at first is a contact of a power line; the contact which is always in low level is a contact of a ground line; the contact of which a signal is converted to be in low level at first and starts the communication, when both contacts of a data signal and a clock signal line are in high level, in the case of the start of the communication, is the contact of the data line; and the other contact is the contact of the clock signal line.

Or alternatively,

The step B further comprises the following steps of:

step B00: storing data corresponding to the corresponding distribution of contact functions of all the types of chips, which can be adapted by the imaging cartridge chip, into different storage areas in advance; and step B01: acquiring the type of the chip according to the acquired electric signal characteristics of the contacts, and calling data of the storage area to be communicated with the imaging body.

Furthermore, in the above method, the step C further comprises the following steps of:

step C01: causing the module of automatic contact-identifying to write the position of each contact identified in the step B into the contact distribution locking EEPROM; and step C02: causing the dynamic contacts of the chip to correspond to corresponding contact functions in a full range of the contact functions, via the contact distribution module according to the information in the EEPROM.

As chip contacts of the present invention have flexible functions and can be self-adaptive to terminal functions of a printer body along with the update of the printer body, the phenomenon that, a circuit board must be re-designed due to the fact that chip contacts must be changed in view of the change of imaging body terminals, or else the circuit board cannot be used, can be avoided. Therefore, the versatility of chips can be effectively improved and the production cost can be reduced.

Meanwhile, the chip data can be designed into different data structures. The chip not only can self-adaptively change various contact definitions of the chip but also can call different storage units to correspond to the contact definitions according to the positions of differently defined contacts, and thus the objective that one chip corresponds to different models of printers with different contact functions can be achieved. Therefore, the versatility of the chip can be maximally satisfied and the inventory and management cost of the chip can be reduced.

Detailed description will be given below to the technical proposal of the present invention with reference to the preferred embodiments of the accompanying drawings.

BRIEF DESCRIPTION OF THE DRAWINGS

FIG. 6 is a flowchart illustrating the automatic identification process in the third embodiment of the present invention.

DETAILED DESCRIPTION OF THE PREFERRED EMBODIMENTS

Figure 1:
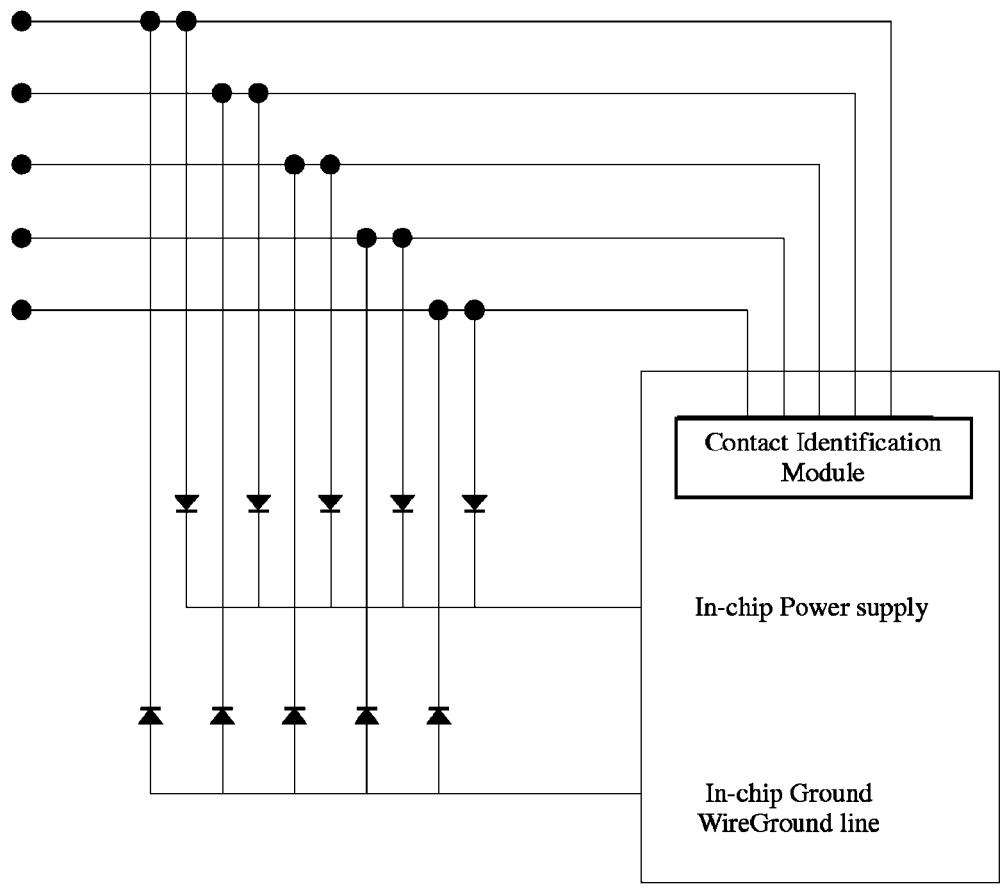
FIG. 1 is a schematic diagram of a power supply circuit of an imaging cartridge chip before the identification and distribution of contact functions, in accordance with the present invention.
Figure 2:
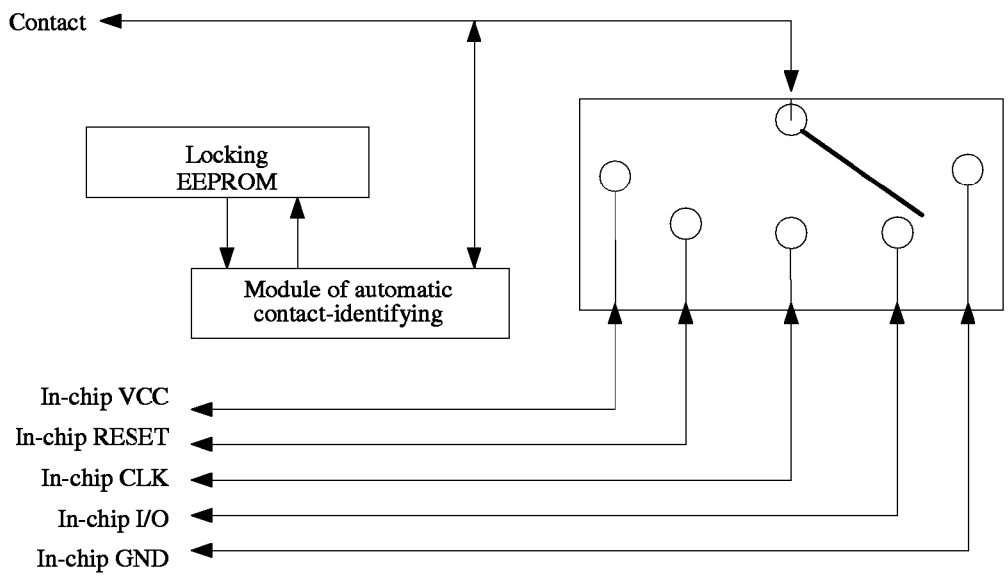
FIG. 2 is a schematic diagram showing the structure of an automatic contact identification and distribution module, in accordance with the present invention.

As illustrated in FIG. 1, the embodiment relates to an imaging cartridge chip with self-adaptive contacts. The chip is arranged on a surface of an imaging cartridge and communicated with an imaging body through several contacts on the chip surface. Currently, there are two mainstream communication protocols which are respectively bus communication protocol and I2C bus protocol. As for the bus communication protocol, there are five contacts which are respectively VCC, CLK, RST, GND and I/O. As for the I2C bus protocol, there are four effective contacts which are respectively VCC, GND, SDA and SCL. As illustrated in FIG. 1, the imaging cartridge chip provided by the embodiment comprises a storage unit and a communication interface unit, wherein the storage unit is configured to store characteristic data of the imaging cartridge; and the communication interface unit includes a group of dynamic contacts which make contact with static contacts disposed on an imaging body and receive electric signals on the static contacts of the imaging body or transmit information to the imaging body. Moreover, compared with other imaging cartridge chips, the imaging cartridge chip provided by the embodiment further comprises an automatic contact identification and distribution module; and each contact in all the dynamic contacts has a full range of contact functions. That is to say, as illustrated in FIG. 2, in the imaging cartridge chip of the embodiment, each dynamic contact is designed to have all the contact functions; the function of the contact is selected by a selection switch; once a function is selected and distributed to a contact, the function can be locked and used in the future work. The automatic contact identification and distribution module includes a signal acquisition unit, an module of automatic contact-identifying and a contact distribution locking module, wherein the signal acquisition unit is connected with the communication interface unit and configured to acquire the electric signal characteristic of each static contact connected with the communication interface unit; the module of automatic contact-identifying is connected with the signal acquisition unit and configured to receive the electric signal characteristic of each contact acquired by the signal acquisition unit and obtain corresponding function of each static contact on the imaging body; and the contact distribution locking module is connected with the module of automatic contact-identifying and configured to select corresponding function of each contact from a full range of the contact functions contained in the contact, and lock the corresponding function of the contact. There are various forms of contact distribution locking modules. As illustrated in FIG. 2, the contact distribution locking module in the embodiment includes a locking EEPROM and a contact distribution executing unit, wherein the locking EEPROM is read by the module of automatic contact-identifying; and the contact distribution executing unit is configured to read the locking EEPROM and select specific functions in the locking EEPROM from a full range of the contact functions. FIG. 2 illustrates the automatic contact identification and distribution module which starts work after being supplied with power by the high-level contact when a first high level of an external contact arrives, and ends work until the final high level is converted to be low. The automatic contact identification and distribution module is configured to monitor and automatically identify and determine all the contacts of the chip. In general, a first high-level contact corresponds to a power line. The safest chip operation mode is to supply power for the chip at first, and hence other operations of the chip can be achieved. In addition, a reset signal line is the second contributing signal line. If the reset line is invalid, the other operations of the chip are invalid, so that the reset signal line must be converted to be valid before the chip operations. Moreover, a clock signal and a data signal have obvious differences. Firstly, the periodicity of the data signal is not stronger than that of the clock signal; and secondly, the frequency of the data signal is not higher than that of the clock signal. Based on the above differences, the automatic contact identification and distribution module not only can achieve automatic identification and determination by hardware via a logic circuit but also can achieve automatic identification and determination by programs via software programming. After the contacts are determined, contacts are not required to be determined and adapted again in the future operation, but the contacts determined when the chip is mounted on the first time are fixed. For instance, aiming at the case of FIG. 2, the contact distribution locking EEPROM is supposed to have a 5-bit EEPROM number. When the chip is not mounted on, the 5-bit EEPROM number is 00000; when the chip is mounted on the first time, if an external contact is determined to be a RESET contact, the module of automatic contact-identifying automatically writes the 5-bit number to 01000 which is permanently stored by the EEPROM; and when the chip is electrified and used the next time, as the 5-bit number is not all 0 and the second digit of the 5-bit number is 1, the chip does not need to automatically identify the contact again and the contact is connected to the RESET. Other contacts are designed in a similar way.

The imaging cartridge chip in the embodiment further comprises an internal power supply acquisition circuit. As illustrated in FIG. 1, when the imaging cartridge chip is mounted on the imaging body, the dynamic contacts make contact with the static contacts. At this point, as the imaging cartridge chip does not identify power supply signals on the dynamic contacts, electric energy cannot be acquired from contacts of the communication interface before the contact identification. A power supply and a ground line in the static contacts are connected with a power supply and a ground line in the imaging cartridge chip through the power supply acquisition circuit, so that the imaging cartridge chip can be electrified and achieve automatic contact identification and contact function locking.

As illustrated in FIG. 1, the internal power supply acquisition circuit is respectively connected with an internal power supply terminal and an internal power supply ground terminal of the imaging cartridge chip and includes a first lead group configured to connect each contact to the internal power supply terminal of the imaging cartridge chip, a second lead group configured to connect each contact to the internal power supply ground terminal of the imaging cartridge chip, and diodes respectively arranged on each lead in the first lead group and the second lead group. On the first lead group, P poles of the diodes are connected with the contacts and N poles are connected with the internal power supply terminal of the imaging cartridge chip; and on the second lead group, N poles of the diodes are connected with the contacts and P poles are connected with the internal power supply ground terminal of the imaging cartridge chip. In other embodiments, the diodes may also be replaced by other unilateral conductive elements as long as the direction of the unilateral conductive elements on the first lead group is from the dynamic contacts to the internal power supply terminal of the imaging cartridge chip and the direction of the unilateral conductive elements on the second lead group is from the internal power supply ground terminal of the imaging cartridge chip to the dynamic contacts.

FIG. 1 illustrates the simplest power supply mode of the chip, namely any contact is connected with an internal power supply in the chip through a diode. When any external contact without determined function is in high level, the contact can supply power to the internal power supply through a diode. In addition, due to the unilateral power supply function of the diode, other contacts will not be affected. Once the power supply of the chip internal begins, the automatic contact identification and distribution module starts work and automatically identifies and locks the contact functions.

Similarly, various external contacts are also connected with an internal ground of the chip through respective diodes, but the direction of the diodes is opposite to the direction of diodes connected with the internal power supply. Therefore, when any external contact is in low level, the internal ground can discharge to the outside through a diode connected with the low-level contact. That is to say, power supply and ground discharge can form an operating circuit to guarantee the normal operation of the chip.

An analysis processing unit in the embodiment is a main unit for completing the self-adaptive operation of contacts, is an intelligentized unit, and is configured to obtain corresponding functions of various dynamic contacts on the imaging body.

Figure 4:
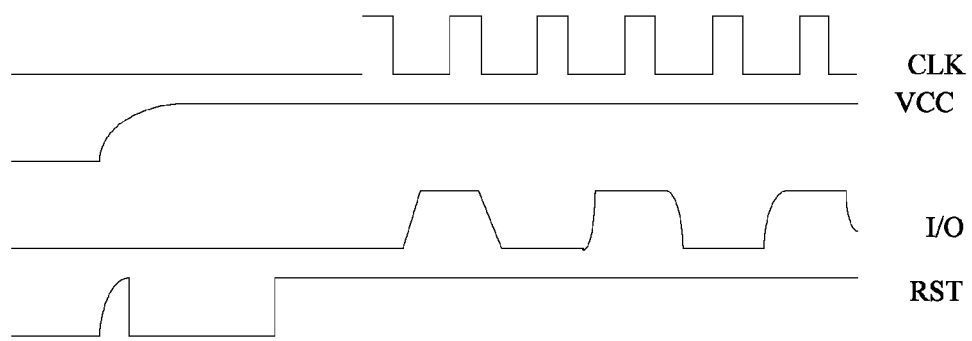
FIG. 4 is a schematic diagram of signal, according to the first embodiment of the present invention.

In the embodiment, during the first actual operation of the chip, the chip not only has normal basic chip functions but also has a function of self-adaptive contact and identification. In the case of a normal protocol, a power supply is electrified at first, so that a power contact can be locked; if a reset line exists and particularly when the low-level reset is valid, as illustrated in FIG. 4, the reset line is the second contact of which the normal level is high, in which as other signal lines do not function if the reset line is in low level, the reset line must be in high level before the normal operation of the chip; and as the working frequency of a clock line is higher than that of a data line, the clock contact and the data contact may also be locked. Moreover, corresponding EEPROM is arranged in the chip. Corresponding function lines can be fixedly distributed on corresponding contacts, and second self-adaptive identification is not required in the future use, so that the use stability of the chip can be guaranteed. Moreover, the contact functions can be locked after the chip receives a group of complete data communication signals from the imaging body, so that the correctness of the contact functions can be guaranteed.

Figure 3:
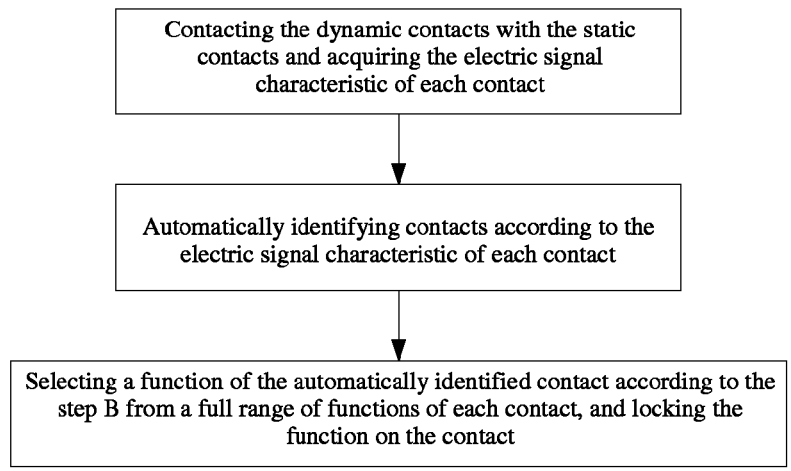
FIG. 3 is a flowchart of the present invention.

The flowchart of the self-adaptive operation of the contacts in the embodiment is as illustrated in FIG. 3. The specific steps are as follows:

step A: contacting the dynamic contacts with the static contacts and allowing the module of automatic contact-identifying to acquire the electric signal characteristic of each contact;

step B: causing the module of automatic contact-identifying to automatically identify contacts according to the electric signal characteristic of each contact; and step C: selecting a function automatically identified in the step B from a full range of functions of each contact, and locking the function on the contact In the embodiment, the step B is the key step. The functions can only be locked on corresponding contacts after the functions of each static contact are correctly identified in the step B.

The contact identification flow is as illustrated below.

FIG. 4 illustrates an oscillogram of a communication protocol chip in the start of work. It can be seen that: a power supply VCC has stable high level at first, and at this point, the self-adaptive chip fixes the VCC line. Herein, stable electrification refers to that the level is stably high after electrification, and no fluctuation or pulse will occur. A reset signal line, i.e. a RST line, is stably electrified next. An EPSON printer transmits a data zero at first, namely a clock line CLK is converted to be in high level; an I/O line is the next line to be converted to be in high level; and a ground GND is always in the low level. Moreover, corresponding contact functions may also be locked after the chip adopts the previous several digits transmitted by the imaging body or accepts a group of complete or nearly complete imaging body waveforms. The phenomenon that the frequency of the clock line is definitely higher than that of the data signal line is also a determination parameter.

In summary, the present invention relates to an imaging cartridge chip with the self-adaptive contact function. When the imaging cartridge chip is manufactured and leaves factory, each contact has a full range of contact functions, and the imaging cartridge chip does not lock certain specific function to certain contact; only when the imaging cartridge is mounted on an imaging device, the chip automatically determines peripheral electric signal characteristics in the case of initial mounting and automatically locks corresponding functions on corresponding contacts according to the peripheral electric signal characteristics, and locks the functions in the future use. Therefore, convenience can be provided for the formal use of the chip.

More specifically, in a serial communication chip adopting normal known technology, corresponding serial communication protocols are used for locking the function definition of each contact of the chip, and communication parameters of communication protocols under corresponding contact function definitions are also fixed, for instance, the electric signal relationships among power supply line, clock line, data line and reset line. The contact functions in the waveform can be determined according to the corresponding waveform relationship and the communication protocols. The chip with the self-adaptive function in the embodiment may also determine contact functions of corresponding terminals of the imaging body by the method, locks the functions into the ink cartridge chip, and locks the functions in the future use so that the functions of universal contacts of the chip can be locked and the chip can become the chip for locking the contact functions. Moreover, in some cases, the chip does not lock the functions all the way when used, is self-adaptive to the functions of various contacts when connected with the imaging body each time, and is matched with the imaging body. Obviously, the method may also be applied to the toner cartridge chip.

In the embodiment, chip data are designed into different data structures. When a imaging device has different contacts, the chip not only can self-adaptively change various contact definitions of the chip but also can call different storage units to correspond to various contact definitions according to the positions of differently defined contacts. Therefore, the objective that one chip corresponds to different types of imaging devices with different contact functions can be achieved.

In a normal serial communication chip, corresponding serial communication protocols are used for fixing the function definition of each contact of the chip, and communication parameters of communication protocols under corresponding contact function definitions are also fixed, for instance, the electric signal relationships among power supply line, clock line, data line and reset line. The user can determine the functions of contacts in the waveform according to the corresponding waveform relationship and the communication protocols. The chip with the self-adaptive function in the embodiment may also determine contact functions of corresponding terminals of the imaging body by the method, locks the functions into the ink cartridge chip, and locks the functions in the future use so that the functions of universal contacts of the chip can be locked and the chip can become the chip for locking the contact functions.

As for the connection relationships between various contacts of the chip, apart from the original fixed function relationships of the chip, the function similar to a power supply full-bridge rectifier is additionally designed, namely any two contacts are positive pole and negative pole respectively. As long as one contact is in low level, guarantee can be made that any contact can normally supply power for the chip when the high level arrives, so that the chip can operate normally.

In the case of actual operation for the first time, the chip not only has the normal basic chip functions but also has the function of identifying the self-adaptive contact function. Under a normal protocol, a power supply is electrified at first, so that a power contact can be fixed. If there is a reset line, particularly the reset is valid when the reset line is in low level, the reset line is the second contact of which the normal level is high, as illustrated in FIG. 4. As other signal lines do not function when the reset line is in low level, the reset line must be in high level before the normal operation of the chip. As the working frequency of a clock line is higher than that of a data line, the clock line and the data line may also be fixed. The chip is provided with corresponding EEPROM. Corresponding function lines can be fixedly distributed to corresponding contacts via the data control of the EEPROM, so that second self-adaptive identification is not required in the future use, and thus the use stability of the chip can be guaranteed. Moreover, the contact functions may also be locked after the chip receives a group of complete data communication signals from a imaging body, so that the correctness of the contact functions can be guaranteed. The stable electric signals can be easily determined, for digital signals, there can determined by the power-on time, the power-off time and the pulse number within a period of time. For instance, as illustrated in FIG. 4, VCC refers to the power supply, so only one pulse exists within the power-on and power-off time periods, with the upper portion of the pulse as the power-on period and the lower portion as the power-off period. RST must be valid within the whole power supply time slice, and the pulse number is only less than that of the VCC. CLK has all the data digits and hence has the maximum pulse number within the power-on period. As the I/O does not change each time, the pulse number is less than that of CLK but far more than that of the RESET. Therefore, only signals of the VCC and the RST are stable and signals of the CLK and the I/O contacts are always varied.

As illustrated in FIG. 4, when a communication protocol chip starts work, the power supply VCC has stable high level at first, and at this point, the self-adaptive chip fixes the VCC; the reset signal line, i.e. the RST line, is stably electrified next; and if an EPSON printer transmits the data zero at first, the clock line CLK is converted to be in high level; the I/O line is the next to be converted to be in high level; and the ground GND is always in the low level. Moreover, corresponding contact functions may also be locked after the chip adopts the previous several digits transmitted by the imaging body or receives a group of complete or nearly complete imaging body waveforms. The phenomenon that the frequency of the clock line is higher than that of the data signal line is also a determination parameter.

Figure 5:
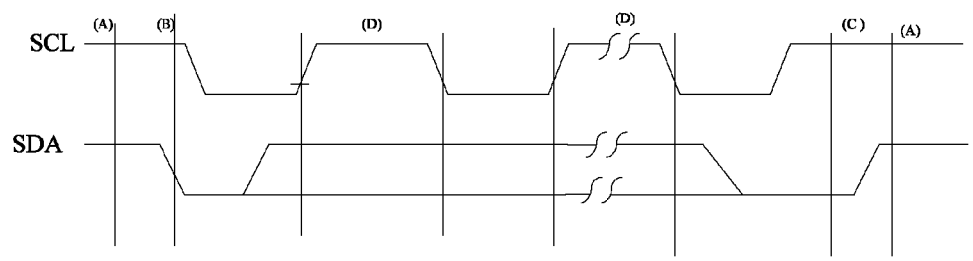
FIG. 5 is a schematic diagram showing the signal of SCL and the signal of SDA in the second embodiment of the present invention.

The IIC (I2C) communication protocol is as illustrated in FIG. 5. a data line is the signal line which is converted to be in low level at first and starts the communication, when both a data signal line and a clock signal line are in high level, in the case of the start of the communication. When the clock line is in high level, the data line is converted to be in high level from low level, which indicates the end of the communication. When a complete communication process ends, the EEPROM in the self-adaptive chip locks the SCL clock line and the SDA data line, and fixedly uses the SCL clock line and the SDA data line in the future. Moreover, corresponding contact functions may also be locked after the chip adopts the previous several digits transmitted by the imaging body or receives a group of complete or nearly complete imaging body waveforms. The phenomenon that the frequency of the clock line is higher than that of the data signal line is also a determination parameter, as illustrated in FIG. 5.

Chip data are designed into different data structures. When a imaging device has different contacts, the chip not only can self-adaptively change various contact definitions of the chip but also can call different storage units to correspond to various contact definitions according to the positions of differently defined contacts. Therefore, the objective that one chip corresponds to different types of imaging devices with different contact functions can be achieved.

For example, a chip with self-adaptive contacts complies with the IIC communication protocol. There are three data storage areas, namely A, B and C, in the chip, corresponding to three chip types. That is to say, the chip can be self-adaptive to the three types of chips. Supposing that three lines among four communication lines are definitely in high level and one ground line is in low level, based on the IIC communication protocol when the chip starts work, and supposing that contacts 1, 2 and 3 are in high level and a contact 4 is in low level, the chip may automatically identify the contact 4 to be the ground line at this point. In the case of the start of the IIC protocol communication, when the clock line SCL is in high level, the data line SDA is converted to be in low level at first, which indicates the start of the communication, and the clock line SCL is the next line to be converted to be in low level. Supposing the contact 1 is converted to be in low level at first and the contact 2 is converted to be in low level along with the contact 1, the chip can identify the contact 1 to be the data line SDA and the contact 2 to be the clock line SCL, and the contact 3 is the power supply VCC. At this point, the chip is known as the first type of chip, and hence data in the storage area A can be called to be communicated with the imaging body.

Supposing the contact 2 is converted to be in low level at first and the contact 1 is converted to be in low level along with the contact 2, the chip can identify the contact 2 to be the data line SDA and the contact 1 to be the clock line SCL, and the contact 3 is the power supply VCC. At this point, the chip is known as the second type of chip, and data in the storage area B can be called to be communicated with the imaging body.

Supposing the contact 1 is converted to be in low level at first and the contact 3 is converted to be in low level along with the contact 1, the chip can identify the contact 1 to be the data line SDA and the contact 3 to be the clock line SCL, and the contact 2 is the power supply VCC. At this point, the chip is known as the third type of chip, and data in the storage area C can be called to be communicated with the imaging body, by parity of reasoning.

The specific steps of the embodiments will be given below, as illustrated in FIG. 6:

storing corresponding data structures of all the types of chips, which can be adapted by the imaging cartridge chip, into different storage areas in advance, in which the data structures illustrate different static contact distribution cases and correspond to corresponding relationship data structures of different storage units; and acquiring the type of the chip according to the acquired electric signal characteristics of the contacts, and calling data in the storage area to be communicated with the imaging body.

Therefore, a memory must be arranged in the imaging cartridge chip. The contact identification module in the embodiment includes a storage unit, a signal acquisition unit, an module of automatic contact-identifying, a locking EEPROM and a contact distribution executing unit, wherein the storage unit is configured to store corresponding relationship data structures, illustrating different static contact distribution cases and corresponding to different storage units, on various types of imaging body;

the signal acquisition unit is connected with the dynamic contacts and configured to acquire the electric signal characteristic of each static contact when the dynamic contacts make contact with the static contacts;

the module of automatic contact-identifying is connected with the signal acquisition unit and configured to receive the electric signal characteristic of each contact acquired by the signal acquisition unit and obtain corresponding functions of various static contacts on the imaging body, call the corresponding relationship data structures in the storage units according to the positions of differently defined contacts, and write the data into the locking EEPROM; and the contact distribution executing unit is configured to read the locking EEPROM and select specific functions in the locking EEPROM from a full range of the contact functions.

It can be seen from the above examples that the chip can be conveniently designed if the contacts of the chip have self-adaptive ability, and extended and applied to several chip products, so that the production management cost can be reduced.

What is claimed is:

1. An imaging cartridge chip with self-adaptive contacts, comprising a group of dynamic contacts making contact with static contacts disposed on an imaging body, the imaging cartridge chip communicated with the imaging body via the contact of the dynamic contacts and the static contacts, wherein, each contact in the dynamic contacts having a full range of contact functions; and the imaging cartridge chip further comprising a contact identification module configured to determine the specific function of each contact in a group of the dynamic contacts according to a signal acquired from the dynamic contact.

2. The imaging cartridge chip with self-adaptive contacts according to claim 1, wherein the contact identification module includes a signal acquisition unit, an module of automatic contact-identifying and a contact distribution locking module, in which the signal acquisition module is connected with the dynamic contacts and configured to acquire the electric signal characteristic of each static contact;

the module of automatic contact-identifying is connected with the signal acquisition unit and configured to receive the electric signal characteristic of each contact acquired by the signal acquisition unit and obtain corresponding function of each static contact on the imaging body; and the contact distribution locking module is connected with the module of automatic contact-identifying and configured to select and lock the corresponding function of the static contact from a full range of the contact functions contained in each contact.

3. The imaging cartridge chip with self-adaptive contacts according to claim 2, wherein the contact distribution locking module includes a locking electronically erasable programmable read-only memory (EEPROM) and a contact distribution executing unit, in which the locking EEPROM is read and written by the module of automatic contact-identifying which locks corresponding static contact functions on corresponding static contacts by writing automatically identified contact functions into the EEPROM; and the contact distribution executing unit is configured to read the locking EEPROM and select specific functions in the locking EEPROM from a full range of the contact functions.

4. The imaging cartridge chip with the self-adaptive contacts according to claim 1, wherein the contact identification module includes a storage unit, a signal acquisition unit, an module of automatic contact-identifying, a locking EEPROM and a contact distribution executing unit, in which
the storage unit is configured to store data corresponding to the distribution of contact functions on various types of imaging body;
the signal acquisition unit is connected with the dynamic contacts and configured to acquire the electric signal characteristic of each static contact;
the module of automatic contact-identifying is connected with the signal acquisition unit and configured to receive the electric signal characteristic of each contact acquired by the signal acquisition unit and obtain corresponding function of each static contact on the imaging body, call the data, corresponding to the corresponding distribution of contact functions, in the storage unit according to the positions of differently defined contacts, and write the data into the locking EEPROM; and
the contact distribution executing unit is configured to read the locking EEPROM and select specific functions in the locking EEPROM from a full range of the contact functions.

5. The imaging cartridge chip with the self-adaptive contacts according to claim 2, wherein the contact identification module includes a storage unit, a signal acquisition unit, an module of automatic contact-identifying, a locking EEPROM and a contact distribution executing unit, in which
the storage unit is configured to store data corresponding to the distribution of contact functions on various types of imaging body;
the signal acquisition unit is connected with the dynamic contacts and configured to acquire the electric signal characteristic of each static contact;
the module of automatic contact-identifying is connected with the signal acquisition unit and configured to receive the electric signal characteristic of each contact acquired by the signal acquisition unit and obtain corresponding function of each static contact on the imaging body, call the data, corresponding to the corresponding distribution of contact functions, in the storage unit according to the positions of differently defined contacts, and write the data into the locking EEPROM; and
the contact distribution executing unit is configured to read the locking EEPROM and select specific functions in the locking EEPROM from a full range of the contact functions.

6. The imaging cartridge chip with the self-adaptive contacts according to claim 1, wherein the imaging cartridge chip further comprises an internal power supply acquisition circuit which is respectively connected with an internal power supply terminal and an internal power supply ground terminal of the imaging cartridge chip; the internal power supply acquisition circuit includes a first lead group configured to connect each contact to the internal power supply terminal of the imaging cartridge chip, a second lead group configured to connect each contact to the internal power supply ground terminal of the imaging cartridge chip, and unilateral conductive devices respectively arranged on each lead in the first lead group and the second lead group; the unilateral conductive devices on the first lead group are configured to achieve the conduction from the contacts to the internal power supply terminal of the imaging cartridge chip; and the unilateral conductive devices on the second lead group are configured to achieve the conduction from the internal power supply ground terminal of the imaging cartridge chip to the contacts.

7. The imaging cartridge chip with the self-adaptive contacts according to claim 2, wherein the imaging cartridge chip further comprises an internal power supply acquisition circuit which is respectively connected with an internal power supply terminal and an internal power supply ground terminal of the imaging cartridge chip; the internal power supply acquisition circuit includes a first lead group configured to connect each contact to the internal power supply terminal of the imaging cartridge chip, a second lead group configured to connect each contact to the internal power supply ground terminal of the imaging cartridge chip, and unilateral conductive devices respectively arranged on each lead in the first lead group and the second lead group; the unilateral conductive devices on the first lead group are configured to achieve the conduction from the contacts to the internal power supply terminal of the imaging cartridge chip; and the unilateral conductive devices on the second lead group are configured to achieve the conduction from the internal power supply ground terminal of the imaging cartridge chip to the contacts.

8. The imaging cartridge chip with the self-adaptive contacts according to claim 3, wherein the imaging cartridge chip further comprises an internal power supply acquisition circuit which is respectively connected with an internal power supply terminal and an internal power supply ground terminal of the imaging cartridge chip; the internal power supply acquisition circuit includes a first lead group configured to connect each contact to the internal power supply terminal of the imaging cartridge chip, a second lead group configured to connect each contact to the internal power supply ground terminal of the imaging cartridge chip, and unilateral conductive devices respectively arranged on each lead in the first lead group and the second lead group; the unilateral conductive devices on the first lead group are configured to achieve the conduction from the contacts to the internal power supply terminal of the imaging cartridge chip; and the unilateral conductive devices on the second lead group are configured to achieve the conduction from the internal power supply ground terminal of the imaging cartridge chip to the contacts.

9. The imaging cartridge chip with the self-adaptive contacts according to claim 4, wherein the imaging cartridge chip further comprises an internal power supply acquisition circuit which is respectively connected with an internal power supply terminal and an internal power supply ground terminal of the imaging cartridge chip; the internal power supply acquisition circuit includes a first lead group configured to connect each contact to the internal power supply terminal of the imaging cartridge chip, a second lead group configured to connect each contact to the internal power supply ground terminal of the imaging cartridge chip, and unilateral conductive devices respectively arranged on each lead in the first lead group and the second lead group; the unilateral conductive devices on the first lead group are configured to achieve the conduction from the contacts to the internal power supply terminal of the imaging cartridge chip; and the unilateral conductive devices on the second lead group are configured to achieve the conduction from the internal power supply ground terminal to the contacts.

10. The imaging cartridge chip with the self-adaptive contacts according to claim 5, wherein the imaging cartridge chip further comprises an internal power supply acquisition circuit which is respectively connected with an internal power supply terminal and an internal power supply ground terminal of the imaging cartridge chip; the internal power supply acquisition circuit includes a first lead group configured to connect each contact to the internal power supply terminal of the imaging cartridge chip, a second lead group configured to connect each contact to the internal power supply ground terminal of the imaging cartridge chip, and unilateral conductive devices respectively arranged on each lead in the first lead group and the second lead group; the unilateral conductive devices on the first lead group are configured to achieve the conduction from the contacts to the internal power supply terminal of the imaging cartridge chip; and the unilateral conductive devices on the second lead group are configured to achieve the conduction from the internal power supply ground terminal to the contacts.

11. An imaging cartridge, comprising the imaging cartridge chip according to claim 1.

12. An imaging cartridge, comprising the imaging cartridge chip according to claim 2.

13. A self-adaptive method of the imaging cartridge chip with the self-adaptive contacts according to claim 1, comprising the following steps of:
    step A: contacting the dynamic contacts with the static contacts and causing the module of automatic contact-identifying to acquire the electric signal characteristic of each contact;
    step B: causing the module of automatic contact-identifying to automatically identify contacts according to the electric signal characteristic of each contact; and
    step C: selecting a function automatically identified in the step B from a full range of functions of each contact, and locking the function on the contact.

14. The self-adaptive method according to claim 13, wherein in the step B:
    the contact electrified at first is a power contact; the contact of which the normal level is high secondly is a reset contact; the contact with the highest signal frequency is a clock contact; the contact of which the signal frequency is higher than that of the power contact and the reset contact but lower than that of the clock contact is a contact of a data line; and the contact which is always in the low level is a ground contact.

15. The self-adaptive method according to claim 13, wherein in the step B:
    the contact which has stable high level at first is a power contact; the contact which is stably electrified secondly is a reset contact; the contact which is converted to be in high level next is a clock contact; the signal which is converted to be in high level after a signal of the clock contact is converted to be in high level is a signal of a data line; and the contact which is always in the low level is a ground contact.

16. The self-adaptive method according to claim 13, wherein in the step B:
    the contact which has stable high level at first is a power contact; the contact which is stably electrified secondly is a reset contact; the contact which is converted to be in high level next is a data contact; the signal which is converted to be in high level after a signal of the data contact is converted to be in high level is a signal of a clock line; and the contact which is always in the low level is a ground contact.

17. The self-adaptive method according to claim 13, wherein in the step B:
    the contact which has stable high level at first is a power contact; secondly, the contact which is always in low level is a ground contact; thirdly, the contact of which a signal is converted to be in low level at first and starts the communication, when both a data contact and a clock contact are in high level, in the case of the start of the communication, is the data contact; and the other contact is the clock contact.

18. The self-adaptive method according to claim 13, wherein the step B further comprises the following steps of:
    step B00: storing data corresponding to the distribution of corresponding contact functions of all the types of chips, which can be adapted by the imaging cartridge chip, into different storage areas in advance; and
    step B01: acquiring the type of the chip according to the acquired electric signal characteristics of the contacts, and calling data of the corresponding storage area to be communicated with the imaging body.

19. The self-adaptive method according to claim 13, wherein the step C further comprises the following steps of:
    step C01: causing the module of automatic contact-identifying to write the positions of various contacts identified in the step B into the locking EEPROM; and
    step C02: causing the dynamic contacts of the chip to correspond to corresponding contact functions in a full range of the contact functions, via the contact distribution module according to the information in the locking EEPROM.

* * * * *